US012312077B2

(12) United States Patent
Morisaki et al.

(10) Patent No.: US 12,312,077 B2
(45) Date of Patent: May 27, 2025

(54) DUCTED FAN DEVICE AND AIRCRAFT

(71) Applicant: MITSUBISHI HEAVY INDUSTRIES, LTD., Tokyo (JP)

(72) Inventors: Yuki Morisaki, Tokyo (JP); Masayuki Oda, Tokyo (JP); Yasuhiro Saiki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/289,177

(22) PCT Filed: Feb. 14, 2022

(86) PCT No.: PCT/JP2022/005664
§ 371 (c)(1),
(2) Date: Nov. 1, 2023

(87) PCT Pub. No.: WO2022/239342
PCT Pub. Date: Nov. 17, 2022

(65) Prior Publication Data
US 2024/0409210 A1 Dec. 12, 2024

(30) Foreign Application Priority Data
May 12, 2021 (JP) ................. 2021-081076

(51) Int. Cl.
*B64C 29/00* (2006.01)
(52) U.S. Cl.
CPC ................. *B64C 29/0091* (2013.01)

(58) Field of Classification Search
CPC ............ B64C 29/0091; B64C 29/0025; B64C 29/0033; F04D 25/166; Y02T 50/60
See application file for complete search history.

(56) References Cited

U.S. PATENT DOCUMENTS

| | | | | |
|---|---|---|---|---|
| 1,725,276 A | * | 9/1929 | Jackson | B64C 27/20 244/23 R |
| 3,033,493 A | * | 5/1962 | Wilde | B64C 29/0058 244/23 R |
| 3,082,977 A | * | 3/1963 | Arlin | B64C 29/0025 244/92 |
| 3,335,976 A | * | 8/1967 | Kappus | B64C 29/0025 244/12.3 |

(Continued)

FOREIGN PATENT DOCUMENTS

| | | |
|---|---|---|
| CN | 109484634 A | 3/2019 |
| JP | 2013-527364 A | 6/2013 |
| WO | 2019-021521 A1 | 1/2019 |

*Primary Examiner* — Medhat Badawi
(74) *Attorney, Agent, or Firm* — Osha Bergman Watanabe & Burton LLP

(57) ABSTRACT

A ducted fan device includes: a plurality of fan devices each having a fan configured to be rotated about a first axis to generate an airflow and a cylindrical smaller duct surrounding the fan about the first axis and extending in a first axis direction; and a cylindrical larger duct extending in a second axis direction parallel to the first axis. Each of the fan devices is arranged on an inner side of the larger duct when viewed in the second axis direction. At least a part of the smaller duct is arranged outside the larger duct on an upstream side in a flow direction of an airflow when viewed in a direction orthogonal to the second axis.

11 Claims, 8 Drawing Sheets

(56) References Cited

U.S. PATENT DOCUMENTS

| | | | | |
|---|---|---|---|---|
| 6,105,901 | A * | 8/2000 | Ulanoski | F01D 17/162 60/228 |
| 6,254,032 | B1 * | 7/2001 | Bucher | B64C 29/0033 244/12.4 |
| 7,149,611 | B2 * | 12/2006 | Beck | B64U 30/26 701/32.4 |
| 8,016,226 | B1 * | 9/2011 | Wood | B64C 29/0033 244/23 B |
| 9,663,237 | B2 * | 5/2017 | Senkel | G05D 1/0858 |
| 9,889,930 | B2 * | 2/2018 | Welsh | A63H 27/12 |
| D825,380 | S * | 8/2018 | Tompkin | D12/16.1 |
| D843,890 | S * | 3/2019 | Yang | D12/16.1 |
| D851,540 | S * | 6/2019 | Tompkin | D12/16.1 |
| 10,526,079 | B1 * | 1/2020 | Reichert | B64C 29/0025 |
| 10,766,615 | B1 * | 9/2020 | Quarrie | B64C 27/24 |
| 10,946,958 | B2 * | 3/2021 | Baek | B64U 30/26 |
| 11,266,863 | B2 * | 3/2022 | Rol | F04D 25/166 |
| 11,597,509 | B1 * | 3/2023 | Alfaro | B64C 29/0025 |
| 11,753,150 | B2 * | 9/2023 | Park | B64U 50/14 244/17.11 |
| 11,919,632 | B2 * | 3/2024 | Nam | B64C 29/0033 |
| 2003/0038213 | A1 * | 2/2003 | Yoeli | B64C 11/001 244/50 |
| 2006/0226281 | A1 * | 10/2006 | Walton | B64C 29/0033 244/17.23 |
| 2009/0283629 | A1 * | 11/2009 | Kroetsch | B64U 20/40 244/17.23 |
| 2011/0042510 | A1 * | 2/2011 | Bevirt | B64C 29/0033 244/12.4 |
| 2011/0101155 | A1 * | 5/2011 | Smith | B64C 39/064 244/12.1 |
| 2011/0250066 | A1 * | 10/2011 | De Roche | F04D 29/544 415/214.1 |
| 2014/0099853 | A1 * | 4/2014 | Condon | B64U 30/26 446/37 |
| 2014/0374532 | A1 * | 12/2014 | Duffy | G05D 1/104 244/2 |
| 2015/0197337 | A1 * | 7/2015 | Tsunekawa | B64C 27/20 244/23 A |
| 2016/0144953 | A1 * | 5/2016 | Werner | A63H 27/12 244/17.23 |
| 2016/0200415 | A1 * | 7/2016 | Cooper | A63H 27/12 244/17.15 |
| 2016/0214728 | A1 * | 7/2016 | Rossi | B64U 30/291 |
| 2016/0229530 | A1 * | 8/2016 | Welsh | B64U 30/24 |
| 2016/0311529 | A1 * | 10/2016 | Brotherton-Ratcliffe | B64D 35/06 |
| 2017/0010622 | A1 * | 1/2017 | Pedersen | G05D 1/0022 |
| 2017/0029097 | A1 * | 2/2017 | Matsumoto | B64D 47/04 |
| 2017/0029101 | A1 * | 2/2017 | Weissenberg | B64U 30/299 |
| 2017/0043869 | A1 * | 2/2017 | Howard | B64U 10/14 |
| 2017/0152060 | A1 * | 6/2017 | Morisawa | G03B 15/006 |
| 2017/0203839 | A1 * | 7/2017 | Giannini | B64D 27/24 |
| 2017/0341776 | A1 * | 11/2017 | McClure | B64U 10/14 |
| 2018/0257775 | A1 * | 9/2018 | Baek | B64U 30/26 |
| 2019/0291855 | A1 * | 9/2019 | Wang | B64U 20/30 |
| 2019/0344105 | A1 * | 11/2019 | Rol | F04D 25/105 |
| 2020/0023970 | A1 * | 1/2020 | Bitar | B64C 39/026 |
| 2020/0031460 | A1 * | 1/2020 | Millhouse | G06Q 10/083 |
| 2020/0094953 | A1 * | 3/2020 | Kondo | B64C 1/22 |
| 2020/0148354 | A1 * | 5/2020 | Morris | B64C 27/28 |
| 2020/0398977 | A1 * | 12/2020 | Fenny | B64C 39/06 |
| 2021/0293252 | A1 * | 9/2021 | Morisaki | B64C 11/001 |
| 2022/0041276 | A1 * | 2/2022 | Scholl | B64U 50/19 |
| 2022/0111950 | A1 * | 4/2022 | Scholl | B64C 27/20 |
| 2022/0169378 | A1 * | 6/2022 | Kuang | B64C 13/503 |
| 2022/0290676 | A1 * | 9/2022 | Imai | B64C 39/005 |
| 2023/0022007 | A1 * | 1/2023 | Nam | B64C 29/0091 |
| 2023/0366325 | A1 * | 11/2023 | Levisse | F01D 9/042 |

* cited by examiner

DUCTED FAN DEVICE AND AIRCRAFT

TECHNICAL FIELD

The present disclosure relates to a ducted fan device and an aircraft.

BACKGROUND ART

In recent years, electrification of aircrafts has been actively developed due to improved performance of power electronics, and one type of the developed aircrafts is a Vertical Take Off & Landing (VTOL) aircraft.

Electrified VTOL aircrafts have different airframe forms in accordance with requirements such as a cruising speed, a cruising distance, and a payload. For example, when a high cruising speed and a long cruising distance are required, a tilt wing aircraft or a tilt rotor aircraft having a primary wing is often employed.

On the other hand, a tilted primary wing or rotor makes it difficult to stably control the flight, and thus a fixed rotor aircraft is often employed when the cruising speed is low and the cruising distance is short.

In this regard, whichever the aircraft form is, it is desirable to employ ducted fans in terms of noise, thrust during hovering, or the like.

In a ducted fan, the thrust is significantly affected by separation of air near the opening (lip portion) of the duct into which air is introduced. Air separation is likely to occur at the lip portion, in particular, during air flowing into the duct at an angle to the axis thereof; specifically, during a transition mode from taking-off/landing to cruising flight, during a crosswind blow, or the like. Thus, how to control air separation at a lip portion is an important issue.

Further, whatever the form of a fan is, it is desirable to generate thrust more efficiently. In this regard, for example, Patent Literature 1 discloses a ducted fan that increases thrust by providing cowls on the inner circumferential side and the outer circumferential side at the bottom end of the duct.

CITATION LIST

Patent Literature

[PTL 1]
Japanese Patent Application Laid-Open No. 2013-527364

SUMMARY OF INVENTION

Technical Problem

It is desirable to efficiently generate thrust by using a method other than using a ducted fan disclosed in Patent Literature 1. Further, Patent Literature 1 does not mention how to control air separation at the lip portion of the duct.

The present disclosure has been made in view of such circumstances and intends to provide a ducted fan device and an aircraft that can control air separation at a lip portion and improve thrust, quietness, and the like.

Solution to Problem

To achieve the object described above, the ducted fan device and the aircraft of the present disclosure employ the following solutions.

A ducted fan device according to one aspect of the present disclosure has: a plurality of fan devices each having a fan configured to be rotated about a first axis to generate an airflow and a cylindrical smaller duct surrounding the fan about the first axis and extending in a first axis direction; and a cylindrical larger duct extending in a second axis direction parallel to the first axis, each of the fan devices is arranged on an inner side of the larger duct when viewed in the second axis direction, and at least a part of the smaller duct is arranged outside the larger duct on an upstream side in a flow direction of an airflow when viewed in a direction orthogonal to the second axis.

Further, an aircraft according to one aspect of the present disclosure has the ducted fan device described above.

Advantageous Effects of Invention

According to the present disclosure, it is possible to control air separation at a lip portion and improve thrust, quietness, and the like.

DESCRIPTION OF EMBODIMENTS

First Embodiment

A ducted fan device according to the first embodiment of the present disclosure will be described below with reference to the drawings.

Note that, in the following description, when a term "inner side" or "outer side" is used, this means "the inner side in the radial direction" or "the outer side in the radial direction" about an axis Xf or Xd.

Further, when a term "upstream" or "downstream" is used, this means "upstream in a flow direction of an airflow" or "downstream in a flow direction of an airflow".

Figure 1:
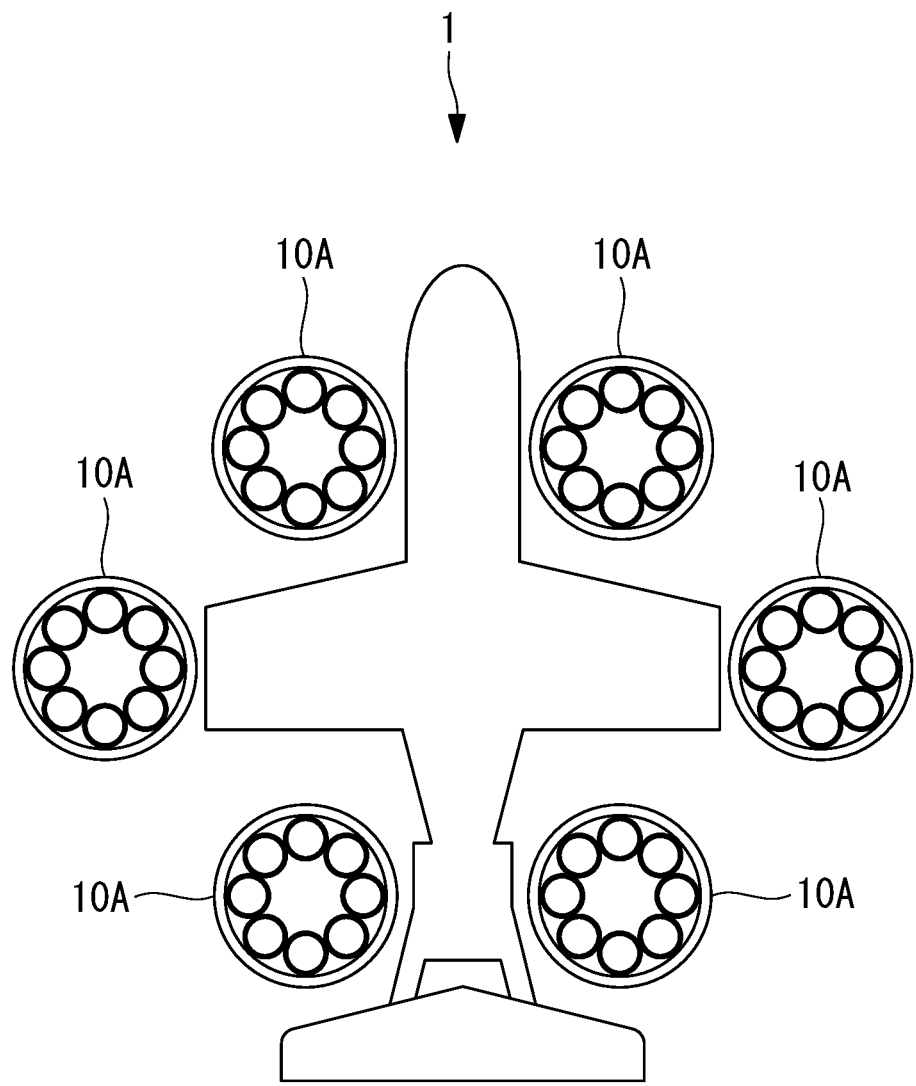
FIG. 1 is a plan view of an aircraft provided with a ducted fan device according to a first embodiment and a second embodiment.

As illustrated in FIG. 1, ducted fan devices 10A are mounted on an aircraft 1 such as a tilt rotor aircraft or a tilt wing aircraft, for example, and serve as devices that generate thrust required for flight of the aircraft 1 (thrust for floatation and propulsion).

Note that, for easier understanding, the ducted fan devices 10A of FIG. 1 are depicted as being apart from the primary wings, the fuselage, and the like, while in the actual implementation, the ducted fan devices 10A are connected to the wings, the fuselage, or the like.

[Configuration of Ducted Fan Device 10A]

Figure 2:
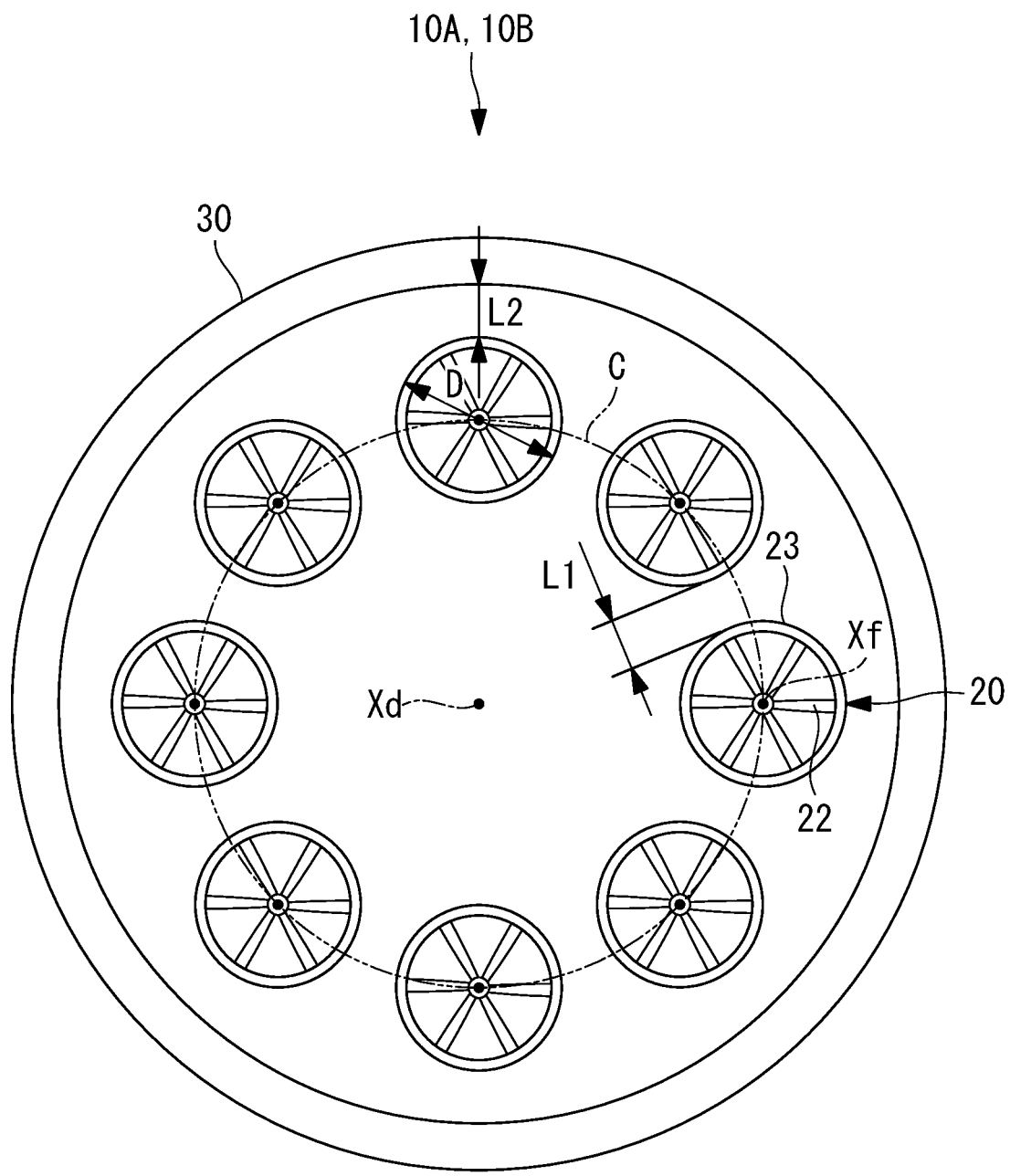
FIG. 2 is a plan view of the ducted fan device according to the first embodiment and the second embodiment.
Figure 3:
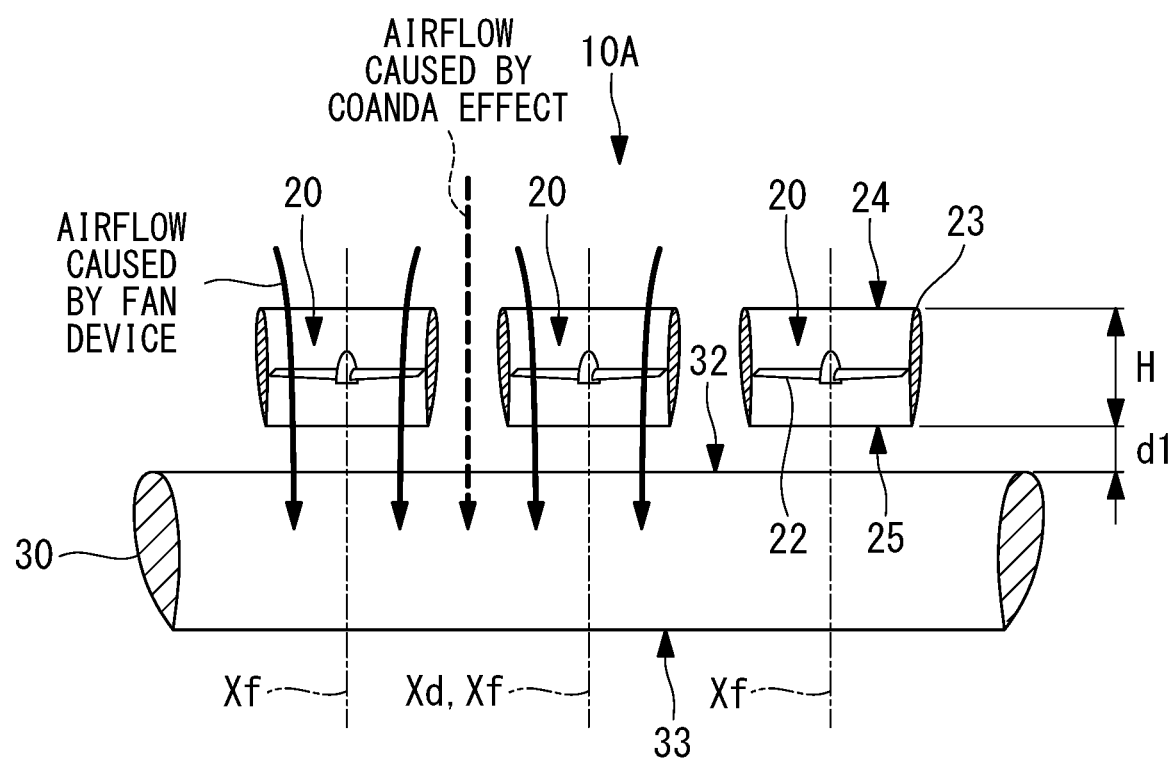
FIG. 3 is a longitudinal sectional view of the ducted fan device according to the first embodiment.

As illustrated in FIG. 2 and FIG. 3, each ducted fan device 10A has a plurality of fan devices 20 and a cylindrical larger duct 30.

Note that, in FIG. 3, some of the fan devices 20 are omitted for easier understanding. Each fan device 20 has a fan 22 and a cylindrical smaller duct 23 surrounding the fan 22. Thus, the fan device 20 is a ducted fan.

The fan 22 is a device that generates an airflow by being driven and rotated about the axis Xf. This airflow serves as a thrust source of the fan device 20.

Each fan 22 is driven and rotated about the axis Xf by an electric motor (not illustrated) in a separate and independent manner. Such separate driving can ensure redundancy as the ducted fan device 10A. Each electric motor is controlled by a corresponding control unit (not illustrated).

The control unit is formed of, for example, a central processing unit (CPU), a random access memory (RAM), a read only memory (ROM), a computer readable storage medium, and the like.

Further, a series of processes for implementing various functions are stored in a storage medium or the like in a form of a program as an example, and the CPU loads such a program into the RAM or the like to perform modification or calculation processing on information, so that the various functions are implemented.

Note that a program may employ a form in which the program is installed in advance in the ROM or other storage media, a form in which the program is provided in a state of being stored in a computer readable storage medium, a form in which the program is delivered via a wired or wireless communication connection, or the like.

The computer readable storage medium may be a magnetic disc, an optical magnetic disc, a CD-ROM, a DVD-ROM, a semiconductor memory, or the like.

The smaller duct 23 is a cylindrical member extending in the axis Xf direction, an opening in one end face serves as an introduction port 24, and an opening in the other end face serves as a discharge port 25. Herein, a dimension along the axis Xf from the introduction port 24 to the discharge port 25 (the height dimension of the smaller duct 23) is defined as H.

The smaller duct 23 accommodates the fan 22 on the inner side thereof so as to surround all the circumferential directions of the fan 22.

When the fan 22 accommodated in the smaller duct 23 is rotated about the axis Xf, an airflow from the introduction port 24 toward the discharge port 25 occurs.

The smaller duct 23 has a function of straightening an airflow generated by the fan 22. This can improve the thrust of each fan device 20.

The larger duct 30 is a cylindrical member extending in the axis Xd direction, an opening in one end face serves as an introduction port 32, and an opening in the other end face serves as a discharge port 33. The larger duct 30 has a sufficiently larger diameter than the smaller duct 23.

As illustrated in FIG. 2, when the ducted fan device 10A is planarly viewed (that is, when viewed in the axis Xd direction), each fan device 20 is arranged on the inner side of the larger duct 30.

Herein, it is preferable that the fan devices 20 be arranged at equal angular intervals in the circumferential direction on a virtual circle C about the axis Xd. This enables the fan devices 20 to be arranged evenly and efficiently. Further, compared to a case where the fan devices 20 are arranged at random, it is easier to manage the spacing between the fan devices 20 and the spacing between the fan device 20 and the larger duct 30.

As illustrated in FIG. 3, when the ducted fan device 10A is viewed from side (viewed in side sectional view) (that is, when viewed in a direction orthogonal to the axis Xd), the entire part of each smaller duct 23 is arranged outside the larger duct 30 in each fan device 20. In detail, the discharge port 25 of the smaller duct 23 is arranged upstream of the introduction port 32 of the larger duct 30.

Herein, it is preferable that a distance d1 from the discharge port 25 of the smaller duct 23 to the introduction port 32 of the larger duct 30 be greater than or equal to 0H and less than or equal to 0.5H. This facilitates generation of an airflow caused by the ejector effect described later.

As illustrated in FIG. 2, when a diameter of the smaller duct 23 is defined as D, it is preferable that a length L1 between the outer circumferential faces of the smaller ducts 23 adjacent in the circumferential direction be greater than or equal to 0.5 D and less than or equal to 1.5 D. This facilitates generation of an airflow caused by the Coanda effect described later.

Further, it is preferable that a length L2 between the outer circumferential face of the smaller duct 23 and the inner circumferential face of the larger duct 30 be greater than or equal to 0.5 D and less than or equal to 1.5 D. This facilitates generation of an airflow caused by the ejector effect described later. Further, as described later, air colliding with the outer circumferential face of the smaller duct 23 is more likely to be guided to the larger duct 30.

[Airflow Caused by Coanda Effect]

As illustrated in FIG. 3, the fan devices 20 are driven separately to generate airflows (hereafter, also referred to as "airflow(s) caused by the fan device(s) 20").

Herein, for example, an airflow caused by one fan device 20 and an airflow caused by another fan device 20 adjacent thereto draw therein the air present between these airflows in the flow direction by the Coanda effect.

This causes an additional airflow to be induced also between the fan devices 20 by the Coanda effect (hereafter, also referred to as "airflow caused by the Coanda effect"). Thus, compared to airflows caused by only the plurality of fan devices 20, more airflows are generated from the introduction port 32 toward the discharge port 33 of the larger duct 30.

Further, since each fan device 20 is arranged on the inner side of the larger duct 30 in planar view, the airflow caused by the fan device 20 and the airflow generated by the Coanda effect (these airflows are collectively also referred to as "two airflows") are straightened by the larger duct 30, and a larger thrust is generated as the ducted fan device 10A.

Herein, when the length L1 is greater than or equal to 0.5 D and less than or equal to 1.5 D, an airflow caused by the Coanda effect can be efficiently induced. If the length L1 is less than 0.5 D, an airflow caused by one fan device 20 and an airflow caused by another fan device 20 adjacent thereto would be attracted to each other, and a flow of the airflow caused by the Coanda effect would be blocked. Further, if the length L1 is greater than 1.5 D, an airflow caused by the Coanda effect would be less likely to be induced. It is more preferable that the length L1 be greater than or equal to 0.5 D and less than or equal to 1.0 D.

[Effect Against Crosswind]

Figure 4:
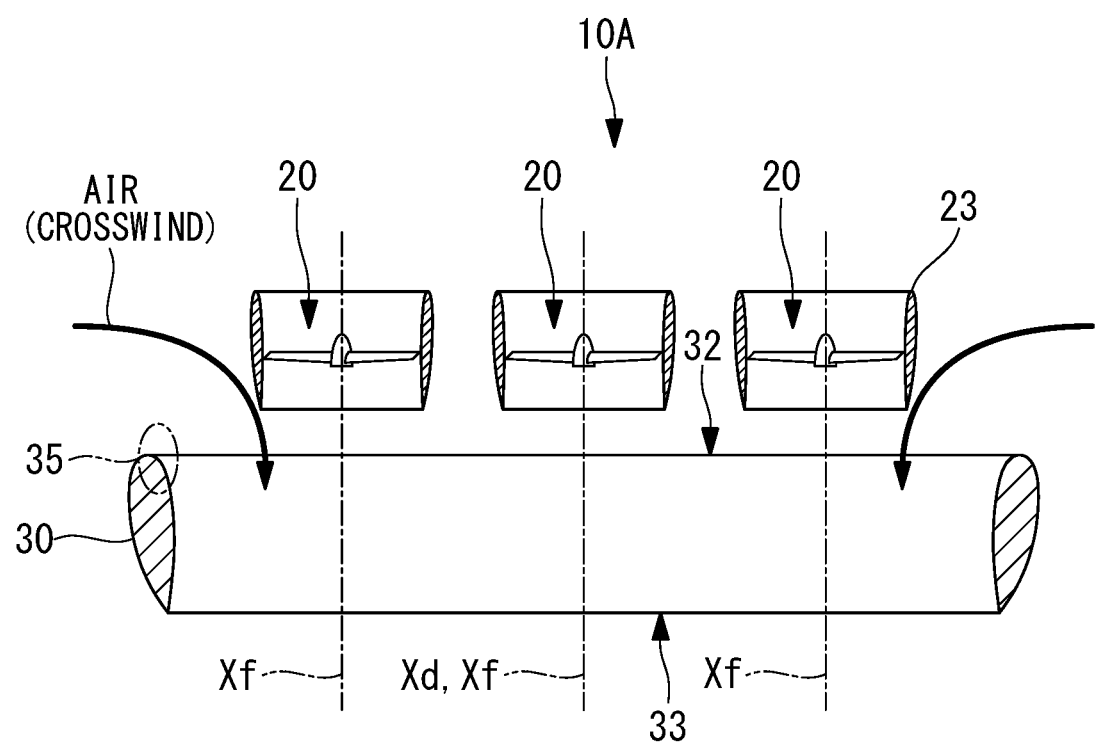
FIG. 4 is a longitudinal sectional view of the ducted fan device according to the first embodiment.

As illustrated in FIG. 4, when air flows from the side to the ducted fan device 10A (that is, when a crosswind blows), air flows to the larger duct 30 as follows.

After colliding with the outer circumferential face of the smaller duct 23, a crosswind is deflected on the outer circumferential face of the smaller duct 23 and forced to flow toward the introduction port 32 of the larger duct 30. Accordingly, even when a crosswind blows, air separation at the lip portion 35 of the larger duct 30 is controlled.

Herein, when the length L2 between the outer circumferential face of the smaller duct 23 and the inner circumferential face of the larger duct 30 is greater than or equal to 0.5 D (see FIG. 2), the area through which air passes is suitably ensured, and air colliding with the outer circumferential face of the smaller duct 23 is more likely to be guided to the larger duct 30.

[Airflow Caused by Ejector Effect]

Figure 5:
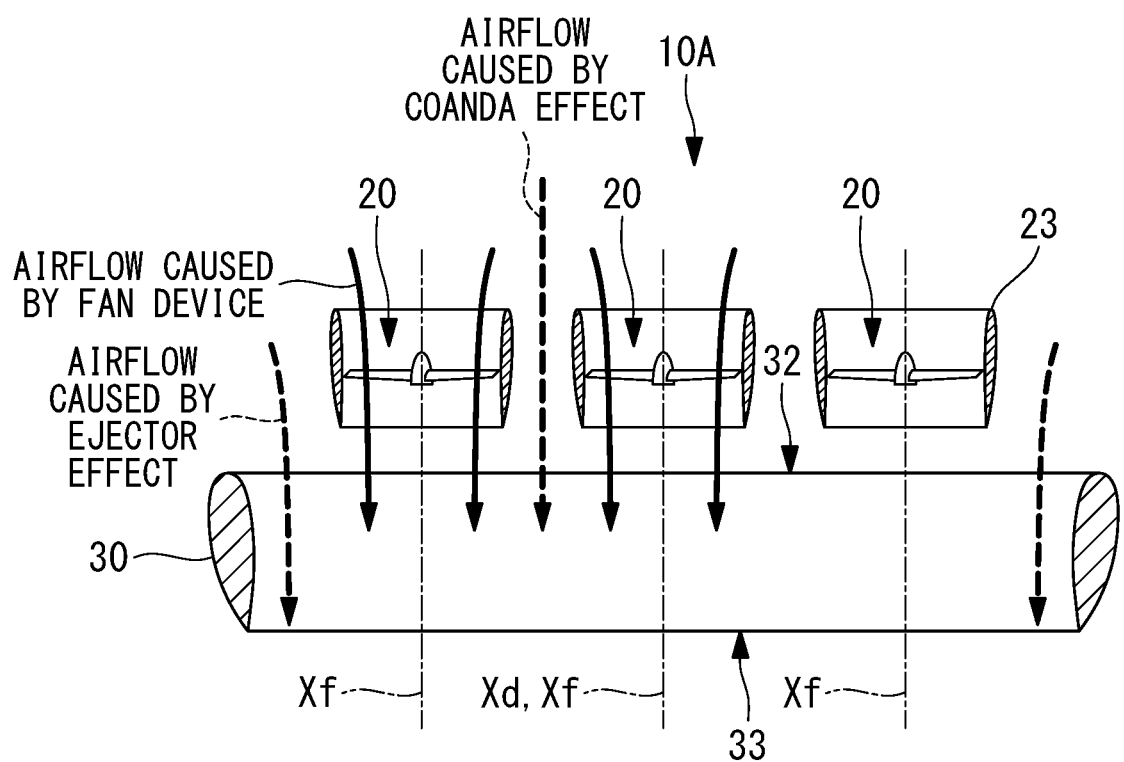
FIG. 5 is a longitudinal sectional view of the ducted fan device according to the first embodiment.

As illustrated in FIG. 5, in the process in which two airflows are guided to the larger duct 30, the two airflows draw therein the surrounding air by the ejector effect. An additional airflow caused thereby is referred to as "airflow caused by the ejector effect".

An airflow caused by the ejector effect flows toward the introduction port 32 of the larger duct 30 together with the two airflows. Thus, compared to a case of only the two airflows, more airflows are generated from the introduction port 32 to the discharge port 33 of the larger duct 30.

Further, since each fan device 20 is arranged on the inner side of the larger duct 30 in planar view, the two airflows and the airflow caused by the ejector effect are straightened by the larger duct 30, and a larger thrust is generated as the ducted fan device 10A.

Herein, when the distance d1 from the discharge port 25 of the smaller duct 23 to the introduction port 32 of the larger duct 30 is greater than or equal to 0H and less than or equal to 0.5H, the area through which air passes is suitably ensured, and the surrounding air is more likely to be drawn in by the ejector effect. If the distance d1 is less than 0H, an insufficient area through which air passes would be ensured, which would result in a reduced effect of an airflow caused by the ejector effect. Further, if the distance d1 is greater than 0.5H, the ejector effect would be less likely to be obtained.

Further, when the length L2 between the outer circumferential face of the smaller duct 23 and the inner circumferential face of the larger duct 30 is greater than or equal to 0.5 D and less than or equal to 1.5 D, the area through which air passes is suitably ensured, and the surrounding air is more likely to be drawn in by the ejector effect. If the length L2 is less than 0.5 D, an insufficient area through which air passes would be ensured, which would result in a reduced effect of an airflow caused by the ejector effect. Further, if the length L2 is greater than 1.5 D, the ejector effect would be less likely to be obtained.

In the present embodiment, the following advantageous effects are achieved.

Each fan device 20 is arranged on the inner side of the larger duct 30 when viewed in the axis Xd direction, and the entire part of each smaller duct 23 is arranged outside the larger duct 30 on the upstream side in the flow direction of an airflow when viewed in a direction orthogonal to the axis Xd. Thus, even when air flows into the ducted fan device 10A from the side thereof, the flow is deflected by the smaller duct 23 and forced to be guided to the larger duct 30. Accordingly, air separation at the lip portion 35 of the larger duct 30 is controlled. As a result, a reduction in the thrust as the ducted fan device 10A is controlled.

Further, a new airflow can be induced between a fan device 20 and another fan device 20 adjacent thereto by the Coanda effect. This improves the thrust as the ducted fan device 10A.

Further, since the distance d1 is greater than or equal to 0H and less than or equal to 0.5H, the spacing between the smaller duct 23 and the larger duct 30 can be suitably maintained. Accordingly, air can be efficiently drawn in by the ejector effect.

Further, since the length L1 is greater than or equal to 0.5 D and less than or equal to 1.5 D, the spacing between a fan device 20 and another fan device 20 through which airflows caused by the Coanda effect are induced can be suitably maintained. If the length L1 is less than 0.5 D, airflows (discharged air) caused by respective fan devices 20 would be attracted to each other, and a flow of the airflow caused by the Coanda effect would be blocked.

Further, if the length L1 is greater than 1.5 D, an airflow caused by the Coanda effect would be less likely to be induced.

Second Embodiment

A ducted fan device according to the second embodiment of the present disclosure will be described below with reference to the drawings.

[Configuration of Ducted Fan Device 10B]

Figure 6:
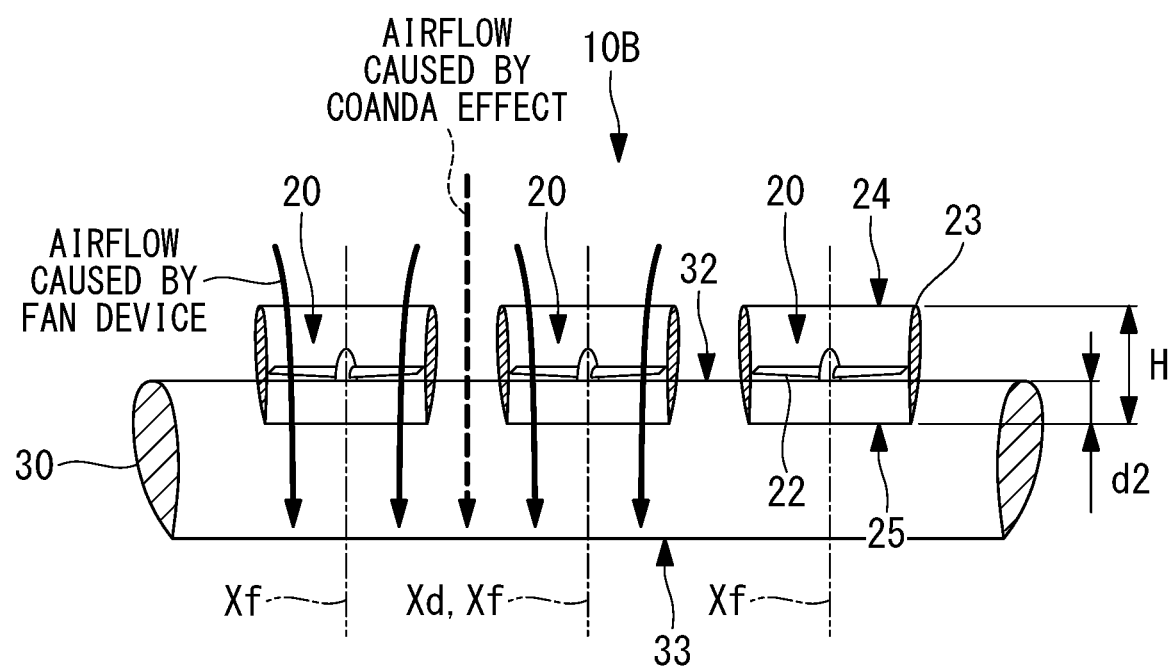
FIG. 6 is a longitudinal sectional view of the ducted fan device according to the second embodiment.

As illustrated in FIG. 2 and FIG. 6, a ducted fan device 10B has a plurality of fan devices 20 and a cylindrical larger duct 30.

As illustrated in FIG. 2, when the ducted fan device 10B is planarly viewed (that is, when viewed in the axis Xd direction), each fan device 20 is arranged on the inner side of the larger duct 30. This feature is the same as that in the first embodiment.

As illustrated in FIG. 6, when the ducted fan device 10B is viewed from side (viewed in side sectional view) (that is, when viewed in a direction orthogonal to the axis Xd), in each fan device 20, a part of the smaller duct 23 is arranged outside the larger duct 30, and the remaining part of the smaller duct 23 is arranged inside the larger duct 30. In detail, the introduction port 24 of the smaller duct 23 is arranged upstream of the introduction port 32 of the larger duct 30, and the discharge port 25 of the smaller duct 23 is arranged downstream of the introduction port 32 of the larger duct 30.

Herein, it is preferable that a distance d2 from the discharge port 25 of the smaller duct 23 to the introduction port 32 of the larger duct 30 be greater than 0H and less than or equal to 0.5H. This achieves a sound insulation effect described later while avoiding an excessive reduction of the ejector effect.

[Airflow Caused by Coanda Effect]

As illustrated in FIG. 6, an airflow caused by the Coanda effect is induced in accordance with the same principle as that in the first embodiment.

[Effect Against Crosswind]

Figure 7:
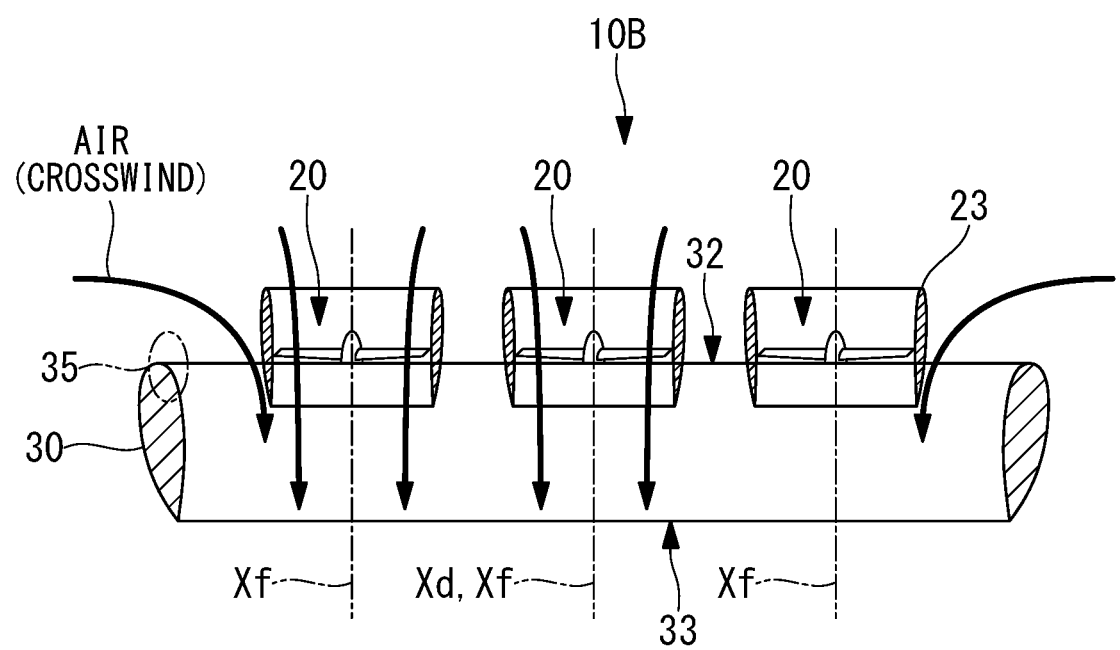
FIG. 7 is a longitudinal sectional view of the ducted fan device according to the second embodiment.

As illustrated in FIG. 7, air that colliding with the outer circumferential face of the smaller duct 23 is guided to the larger duct 30 in accordance with the same principle as that in the first embodiment.

[Airflow Caused by Ejector Effect]

Figure 8:
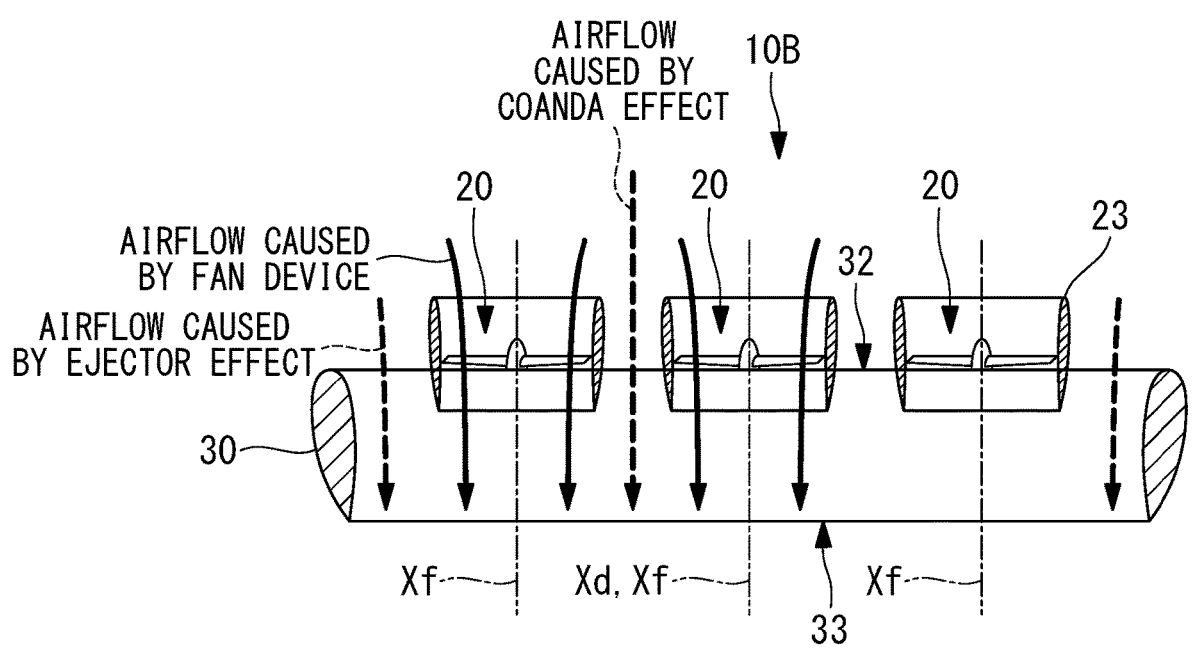
FIG. 8 is a longitudinal sectional view of the ducted fan device according to the second embodiment.

As illustrated in FIG. 8, an airflow caused by the ejector effect is generated in accordance with the same principle as that in the first embodiment.

However, because of the relationship about the area through which air passes, airflows caused by the ejector effect are weaker than those in the first embodiment.

[Sound Insulation Effect]

As illustrated in FIG. 6, in each fan device 20, a part of the smaller duct 23 is arranged outside the larger duct 30, and the remaining part of the smaller duct 23 is arranged inside the larger duct 30. Thus, the fan device 20 is partially accommodated in the larger duct 30.

Because the larger duct 30 surrounds the fan devices 20, noise generated by the fan devices 20 is insulated by the larger duct 30. Accordingly, the noise of the fan devices 20 can be insulated by the larger duct 30.

Herein, when the distance d2 from the discharge port 25 of the smaller duct 23 to the introduction port 32 of the larger duct 30 is greater than 0H and less than or equal to 0.5H, an excessive reduction of the ejector effect can be avoided, and sound insulation properties can be ensured. If the distance d2 is less than or equal to 0H (if the discharge port 25 of the smaller duct 23 is arranged upstream of the introduction port 32 of the larger duct 30), the larger duct 30 would no longer surround the fan devices 20, and no sound insulation effect would be obtained. Further, if the distance d2 is greater than 0.5H, this would increase friction with the outer circumferential face of the smaller duct 23 arranged inside the larger duct 30 and block flows of airflows caused by the ejector effect.

In the present embodiment, the following advantageous effects are achieved.

Each fan device 20 is arranged on the inner side of the larger duct 30 when viewed in the axis Xd direction, and a part of each smaller duct 23 is arranged outside the larger duct 30 on the upstream side in the flow direction of airflows when viewed in a direction orthogonal to the axis Xd. Thus, even when air flows into the ducted fan device 10B from the side thereof, the flow is deflected by the smaller duct 23 and forced to be guided to the larger duct 30. Accordingly, air separation at the lip portion 35 of the larger duct 30 is controlled. As a result, a reduction in the thrust as the ducted fan device 10B is controlled.

Further, a new airflow can be induced between a fan device 20 and another fan device 20 adjacent thereto by the Coanda effect. This improves the thrust as the ducted fan device 10B.

Further, since a part of the smaller duct 23 is arranged outside the larger duct 30 and the remaining part of the smaller duct 23 is arranged inside the larger duct 30, noise of the fan device 20 can be insulated by the larger duct 30.

Further, since the distance d2 is greater than 0H and less than or equal to 0.5H, an excessive reduction of the ejector effect can be avoided, and sound insulation properties can be ensured.

The ducted fan device and the aircraft according to each embodiment described above are understood as follows, for example.

A ducted fan device (10A, 10B) according to one aspect of the present disclosure has: a plurality of fan devices (20) each having a fan (22) configured to be rotated about a first axis (Xf) to generate an airflow and a cylindrical smaller duct (23) surrounding the fan about the first axis and extending in a first axis direction; and a cylindrical larger duct (30) extending in a second axis (Xd) direction parallel to the first axis, each of the fan devices is arranged on the inner side of the larger duct when viewed in the second axis direction, and at least a part of the smaller duct is arranged outside the larger duct on an upstream side in a flow direction of an airflow when viewed in a direction orthogonal to the second axis.

According to the ducted fan device of the present aspect, each of the fan devices is arranged on the inner side of the larger duct when viewed in the second axis direction, and at least a part of the smaller duct is arranged outside the larger duct on an upstream side in a flow direction of an airflow when viewed in a direction orthogonal to the second axis. Thus, even when air flows into the ducted fan device from the side thereof, the flow is deflected by the smaller duct and forced to be guided to the larger duct. Accordingly, air separation at the lip portion of the larger duct is controlled. As a result, a reduction in the thrust as the ducted fan device is controlled.

Further, a new airflow can be induced between a fan device and another fan device adjacent thereto by the Coanda effect. This improves the thrust as the ducted fan device.

Further, when the entire part of each smaller duct is arranged outside the larger duct on the upstream side in the flow direction, a wider spacing between the smaller duct and the larger duct can be ensured. Accordingly, more air is sucked into the larger duct through the spacing by the ejector effect due to airflows generated by the fan device. As a result, the thrust of the ducted fan device is improved.

Further, when only a part of each smaller duct is arranged outside the larger duct on the upstream side in the flow direction, that is, when the remaining part of each smaller duct is accommodated inside the larger duct, noise of the fan device can be insulated by the larger duct while air separation at the lip portion is controlled.

Further, in the ducted fan device according to one aspect of the present disclosure, an end face (25) on the downstream side in the flow direction of every smaller duct is located upstream in the flow direction with respect to an end face (32) on the upstream side in the flow direction of the larger duct.

According to the ducted fan device of the present aspect, the end face on the downstream side in the flow direction of every smaller duct is located upstream in the flow direction with respect to the end face on the upstream side in the flow direction of the larger duct, and thus a wider spacing between the smaller duct and the larger duct can be ensured. Accordingly, more air is sucked into the larger duct through the spacing by the ejector effect due to airflows generated by the fan device.

Further, in the ducted fan device according to one aspect of the present disclosure, when the dimension of the smaller duct along the first axis is defined as H, the distance (d1) along the second axis between the end face on the downstream side in the flow direction of the smaller duct and the end face on the upstream side in the flow direction of the larger duct is greater than or equal to 0H and less than or equal to 0.5H.

According to the ducted fan device of the present aspect, when the dimension of the smaller duct along the first axis is defined as H, the distance along the second axis between the end face on the downstream side in the flow direction of the smaller duct and the end face on the upstream side in the flow direction of the larger duct is greater than or equal to 0H and less than or equal to 0.5H. Thus, the spacing between the smaller duct and the larger duct can be suitably maintained. Accordingly, air can be efficiently sucked by the ejector effect.

Further, in the ducted fan device according to one aspect of the present disclosure, an end face on the downstream side in the flow direction of every smaller duct is located downstream in the flow direction with respect to an end face on the upstream side in the flow direction of the larger duct, and an end face (24) on the upstream side in the flow direction of every smaller duct is located upstream in the flow direction with respect to an end face on the upstream side in the flow direction of the larger duct.

According to the ducted fan device of the present aspect, the end face on the downstream side in the flow direction of every smaller duct is located downstream in the flow direction with respect to the end face on the upstream side in the flow direction of the larger duct, and the end face on the upstream side in the flow direction of every smaller duct is located upstream in the flow direction with respect to the end face on the upstream side in the flow direction of the larger duct. Thus, the smaller duct can be partially surrounded by the larger duct. Accordingly, noise of the fan devices can be insulated by the larger duct.

Further, in the ducted fan device according to one aspect of the present disclosure, when the dimension of the smaller duct along the first axis is defined as H, the distance (d2) along the second axis between the end face on the downstream side in the flow direction of the smaller duct and the end face on the upstream side in the flow direction of the larger duct is greater than 0H and less than or equal to 0.5H.

According to the ducted fan device of the present aspect, when the dimension of the smaller duct along the first axis is defined as H, the distance along the second axis between the end face on the downstream side in the flow direction of the smaller duct and the end face on the upstream side in the flow direction of the larger duct is greater than 0H and less than or equal to 0.5H. Thus, the part of the smaller duct surrounded by the larger duct can be limited. This can realize sound insulation while achieving the ejector effect. If the entire part of the smaller duct is surrounded by the larger duct, air would be less likely to be sucked due to friction with the outer circumferential face of the smaller duct, and the ejector effect would be insufficiently obtained.

Further, in the ducted fan device according to one aspect of the present disclosure, the fan devices are arranged at equal angular intervals in a circumferential direction about the second axis.

According to the ducted fan device of the present aspect, since the fan devices are arranged at equal angular intervals in the circumferential direction about the second axis, the fan devices can be arranged efficiently and evenly.

Further, in the ducted fan device according to one aspect of the present disclosure, when the diameter of the smaller duct is defined as D, the length (L1) between the smaller ducts adjacent to each other in the circumferential direction is greater than or equal to 0.5 D and less than or equal to 1.5 D.

According to the ducted fan device of the present aspect, when the diameter of the smaller duct is defined as D, the length between the smaller ducts adjacent to each other in the circumferential direction is greater than or equal to 0.5 D and less than or equal to 1.5 D. Thus, the spacing between a fan device and another fan device through which airflows caused by the Coanda effect are induced can be suitably maintained. If the length is less than 0.5 D, airflows (discharged air) caused by respective fan devices would be attracted to each other, and a flow of the airflow caused by the Coanda effect would be blocked.

Further, if the length is greater than 1.5 D, the airflow caused by the Coanda effect would be less likely to be induced.

Further, in the ducted fan device according to one aspect of the present disclosure, each of the fan devices is driven separately by a corresponding electric motor.

According to the ducted fan device of the present aspect, since each of the fan devices is driven separately by a corresponding electric motor, redundancy as the ducted fan devices can be ensured.

Further, an aircraft according to one aspect according to the present disclosure has the ducted fan device described above.

REFERENCE SIGNS LIST 1 aircraft
10A, 10B ducted fan device
20 fan device
22 fan
23 smaller duct
24 introduction port
25 discharge port
30 larger duct
32 introduction port
33 discharge port
35 lip portion

The invention claimed is:

1. A ducted fan device comprising:
fan devices each comprising:
a fan that rotates about a first axis and generates an airflow; and
a cylindrical smaller duct surrounding the fan about the first axis and extending in a first axis direction; and
a cylindrical larger duct extending in a second axis direction parallel to the first axis, wherein
each of the fan devices is disposed inside the larger duct when viewed in the second axis direction,
at least a part of the smaller duct is disposed outside the larger duct and upstream of the larger duct in a flow direction of the airflow when viewed in a direction orthogonal to the second axis direction, and
in the flow direction, a downstream end face of the smaller duct of each of the fan devices is disposed upstream with respect to an upstream end face of the larger duct.

2. The ducted fan device according to claim 1, wherein a distance along the second axis direction between the downstream end face of the smaller duct of each of the fan devices and the upstream end face of the larger duct is greater than or equal to 0 H and less than or equal to 0.5 H, where H is a dimension of the smaller duct along the first axis.

3. A ducted fan device comprising:
fan devices each comprising:
a fan that rotates about a first axis and generates an airflow; and
a cylindrical smaller duct surrounding the fan about the first axis and extending in a first axis direction; and
a cylindrical larger duct extending in a second axis direction parallel to the first axis, wherein
each of the fan devices is disposed inside the larger duct when viewed in the second axis direction,
at least a part of the smaller duct is disposed outside the larger duct and upstream of the larger duct in a flow direction of the airflow when viewed in a direction orthogonal to the second axis direction,
in the flow direction, a downstream end face of the smaller duct of each of the fan devices is disposed downstream with respect to an upstream end face of the larger duct, and in the flow direction, an upstream end face of the smaller duct of each of the fan devices is disposed upstream with respect to the upstream end face of the larger duct, and a distance along the second axis direction between the downstream end face of the smaller duct of each of the fan devices and the upstream end face of the larger duct is greater than 0 H and less than or equal to 0.5 H, where H is a dimension of the smaller duct along the first axis.

4. The ducted fan device according to claim 1, wherein the fan devices are disposed at equal angular intervals in a circumferential direction around an axis of the larger duct.

5. The ducted fan device according to claim 4, wherein a length between the smaller duct of one of the fan devices and the smaller duct of an adjacent one of the fan devices in the circumferential direction is greater than or equal to 0.5 D and less than or equal to 1.5 D, where D is a diameter of the smaller duct.

6. The ducted fan device according to claim 1, wherein each of the fan devices is driven separately by a corresponding electric motor.

7. An aircraft comprising the ducted fan device according to claim 1.

8. The ducted fan device according to claim 3, wherein the fan devices are disposed at equal angular intervals in a circumferential direction around an axis of the larger duct.

9. The ducted fan device according to claim 8, wherein a length between the smaller duct of one of the fan devices and the smaller duct of an adjacent one of the fan devices in the circumferential direction is greater than or equal to 0.5 D and less than or equal to 1.5 D, where D is a diameter of the smaller duct.

10. The ducted fan device according to claim 3, wherein each of the fan devices is driven separately by a corresponding electric motor.

11. An aircraft comprising the ducted fan device according to claim 3.

* * * * *